United States Patent
Chang et al.

(10) Patent No.: US 7,939,963 B2
(45) Date of Patent: May 10, 2011

(54) POWER SUPPLY PROVIDING MULTIPLE SYNCHRONOUS OUTPUTS

(75) Inventors: Heng-Chia Chang, Taipei Hsien (TW); Yi-Hua Wang, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 47 days.

(21) Appl. No.: 12/266,311

(22) Filed: Nov. 6, 2008

(65) Prior Publication Data

US 2010/0109432 A1    May 6, 2010

(51) Int. Cl.
   *H02M 1/36* (2007.01)
(52) U.S. Cl. ............................................. 307/39; 307/38
(58) Field of Classification Search ............... 307/38–39
   See application file for complete search history.

(56) References Cited

U.S. PATENT DOCUMENTS

| | | | |
|---|---|---|---|
| 5,828,558 A * | 10/1998 | Korcharz et al. | 363/20 |
| 6,490,179 B1 * | 12/2002 | Boylan et al. | 363/21.06 |
| 6,768,655 B1 * | 7/2004 | Yang et al. | 363/21.01 |
| 6,865,093 B2 * | 3/2005 | Disney | 363/21.1 |
| 6,906,934 B2 * | 6/2005 | Yang et al. | 363/49 |
| 6,972,969 B1 * | 12/2005 | Shteynberg et al. | 363/21.12 |
| 7,006,364 B2 * | 2/2006 | Jin et al. | 363/21.01 |
| 7,099,163 B1 * | 8/2006 | Ying | 363/21.11 |
| 7,268,448 B2 * | 9/2007 | Hasegawa | 307/31 |
| 2006/0050449 A1 * | 3/2006 | Wu | 361/18 |
| 2008/0061758 A1 * | 3/2008 | Nishida | 323/284 |

* cited by examiner

*Primary Examiner* — Jared J Fureman
*Assistant Examiner* — Adi Amrany
(74) *Attorney, Agent, or Firm* — Muncy, Geissler, Olds & Lowe, PLLC

(57) ABSTRACT

A power supply to provide multiple synchronous outputs includes a standby power system to receive input power and regulate to become standby power and a main power system to receive the input power and regulate to become main output power. The main power system has a rectification output unit to deliver the main output power. The power supply further has at least one delay trigger unit to receive the main output power and a voltage regulation output unit. The delay trigger unit sets a voltage judgment level and determines whether to output a trigger signal based on the main output power being greater or smaller than the voltage judgment level. The voltage regulation output unit can be activated by getting the standby power. According to the generation time series of the trigger signal, the time series to generate the secondary output power can be regulated.

10 Claims, 3 Drawing Sheets

POWER SUPPLY PROVIDING MULTIPLE SYNCHRONOUS OUTPUTS

FIELD OF THE INVENTION

The present invention relates to a power supply that provides multiple synchronous outputs and particularly to a circuit adopted for use on a multi-output power supply to change time series difference of output power.

BACKGROUND OF THE INVENTION

A conventional power supply can provide multiple output powers to drive different loads through taper of transformer windings or coupling of multiple windings. For instance, R.O.C. patent No. M244645 entitled "AC distributed power supply" provides a power supply structure in FIG. 2 thereof and a circuit diagram in FIG. 5 showing a transformer equipped with multiple windings to provide multiple outputs at different voltages. However, study and tests indicate that multiple outputs through multiple windings generate more loss and reduce electric energy transformation efficiency. Now research and development in the industry focus on an approach that provides single main output power first from a rear end of the transformer, and has at least one voltage regulation output unit to receive the main output power and regulate to deliver secondary output power different from the main output power. FIG. 1 illustrates such a technique in which the power supply receives input power from a power source 1. The input power passes through a power factor correction unit 21 to supply a main power system and a standby power system 25. The standby power system 25 receives the input power and outputs standby power. The main power system includes a transformer 24 and a pulse width modulation unit 22 to drive a switch 23 to regulate the period of the input power passing through the transformer 24. The secondary side of the transformer 24 generates induction power which is regulated by a rectification output unit 3 to become the main output power sent to a main output end 5. After the rectification output unit 3 has received the induction power, the main output power is formed by going through a voltage boosting process. The duration of boosting the voltage from an initial voltage to a rated voltage is called rise time. The rectification output unit 3 has a rear end connecting to two voltage regulation output units 41 and 42 that have respectively a secondary output end 411 and 421, a power input end 412 and 422 and a biased driving end 413 and 423. After the biased driving ends 413 and 423 have received the main output power, the voltage regulation output units 41 and 42 regulate the main output power received from the power input ends 412 and 422 to become the secondary output power delivering through the secondary output ends 411 and 421. The two voltage regulation output units 41 and 42 may generate the secondary output power at different potentials. Although the structure depicted in FIG. 1 can improve electric energy transformation efficiency, output time series of the main output power and the secondary output power are different. While such a difference does not create problems for most loads, it could cause start failure of a computer motherboard when in use. The existing of the output time series difference is an issue remained to be resolved.

SUMMARY OF THE INVENTION

In view of the aforesaid problem occurred to the conventional technique for improving transformation efficiency at the expense of creating power output time series difference, the primary object of the present invention is to provide a power supply to deliver multiple outputs synchronously.

The power supply according to the invention aims to reduce time series difference of multiple output powers. It includes a standby power system to receive input power and regulate to become standby power and a main power system to receive the input power and regulate to become main output power. The main power system has a rectification output unit to deliver the main output power. The power supply further has at least one delay trigger unit connecting to the rectification output unit to receive the main output power and a voltage regulation output unit that has a power input end, a biased driving end, a feedback detection end and a secondary output end. The delay trigger unit sets a voltage judgment level and determines whether to output a trigger signal based on the main output power being greater or smaller than the voltage judgment level. The voltage regulation output unit can be activated by the standby power received from the standby power system by connecting to the biased driving end. The power input end is connected to the rectification output unit to receive the main output power and regulate to secondary output power. The feedback detection end is connected to the delay trigger unit to receive the trigger signal and determine the time series of sending the secondary output power to the secondary output end according to the generation time series of the trigger signal. By means of the circuit operation set forth above, the voltage regulation output unit can get the standby power and be activated first, the trigger signal can be generated after the rectification output unit has regulated the main output power to a higher voltage to reach the voltage judgment level, then the voltage regulation output unit is ordered to start generating the secondary output power. Hence the time series difference of the main output power and the secondary output power can be shrunk to achieve almost synchronous output to prevent the problem of unable to drive loads.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
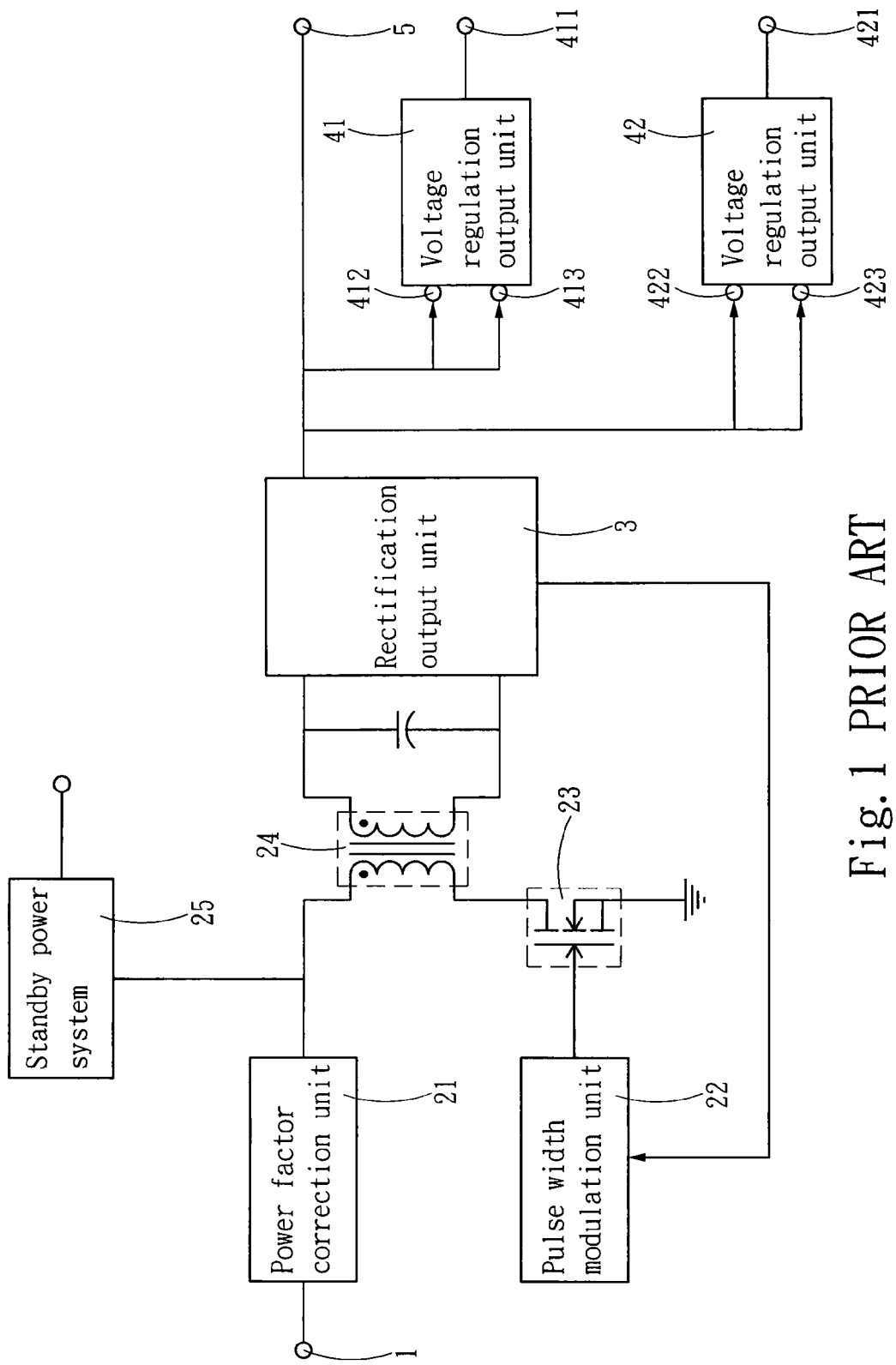
FIG. 1 is a circuit diagram of a conventional power supply.
Figure 2:
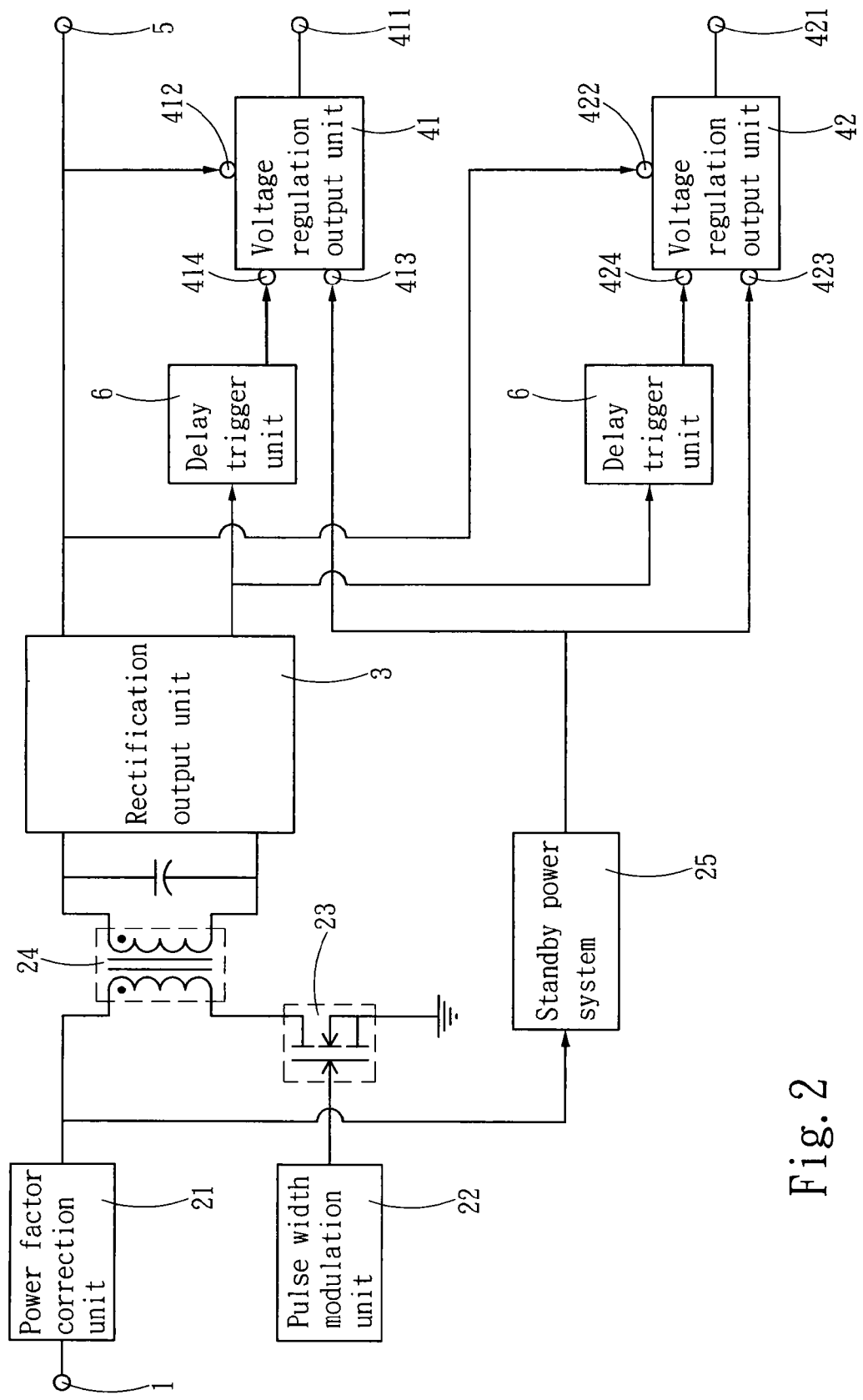
FIG. 2 is a circuit diagram of the invention.

Please refer to FIG. 2 for the circuit diagram of the invention. The power supply according to the invention receives input power from a power source 1. The input power passes through a power factor correction unit 21 to supply a main power system and a standby power system 25. The standby power system 25 receives the input power and delivers standby power. The main power system includes a transformer 24 and a pulse width modulation unit 22 to drive a switch 23 to regulate the period of the input power passing through the transformer 24. The transformer 24 has a secondary side to induce electric power. The induced electric power is regulated by a rectification output unit 3 to become the main output power sent to a main output end 5. The power supply further has at least one delay trigger unit 6 connecting to the rectification output unit 3 to receive the main output power and at least one voltage regulation output unit 41 which has a power input end 412, a biased driving end 413, a feedback detection end 414 and a secondary output end 411. The voltage regulation output unit 41 receives the main output power and regulate to secondary output power sent to the secondary output end 411. The voltage regulation output unit 41 has to receive the biased power to be activated. To enable the voltage regulation output unit 41 to be activated earlier, the biased driving end 413 is connected to the standby power system to receive the standby power to get the biased power for activation. Moreover, the rectification output unit 3 regulating the induced power to become the main output power requires a rise time. The voltage regulation output unit 41 also needs another rise time after activation. To synchronize output of the main output power and the secondary output power, the aforesaid rise time have to be taken into account. By connecting the voltage regulation output unit 41 to the delay trigger unit 6, the delay trigger unit 6 sets a voltage judgment level and output a trigger signal the main output power is greater than the voltage judgment level. The voltage regulation output unit 41, based on the generation time series of the trigger signal, determines the time series of sending the secondary output power to the secondary output end 411. For instance, if the delay trigger unit 6 sets 7V as the voltage judgment level, before the voltage of the main output power rises to 7V, the delay trigger unit 6 does not trigger operation of the voltage regulation output unit 41 (but the voltage regulation output unit 41 has already received the standby power and activated). When the main output power rises over 7V, the delay trigger unit 6 outputs the trigger signal to order the voltage regulation output unit 41 to start regulating and boosting the voltage of the secondary output power so that the secondary output power and the main output power are delivered synchronously. Therefore, the object of the invention to output multiple power synchronously can be accomplished. The power supply also can provide more output power. Referring to FIG. 2, the main power system can be connected to another voltage regulation output unit 42 which has a second power input end 422, a second biased driving end 423, a second feedback detection end 424 and another secondary output end 421. The second biased driving end 423 is connected to the standby power system 25. The second power input end 422 is connected to the rectification output unit 3 to receive the main output power. The second feedback detection end 424 is connected to the delay trigger unit 6 to judge the potential of the main output power and determine whether to generate the trigger signal, then trigger another voltage regulation output unit 42 to send the secondary output power to another secondary output end 421. While FIG. 2 shows that two voltage regulation output units 41 and 42 are provided to connect the rectification output unit 3, the power supply may have a plurality of voltage regulation output units 41 and 42 to provide multiple secondary output powers. Moreover, at least two of the secondary output powers have different potentials to meet load requirements.

Figure 3:
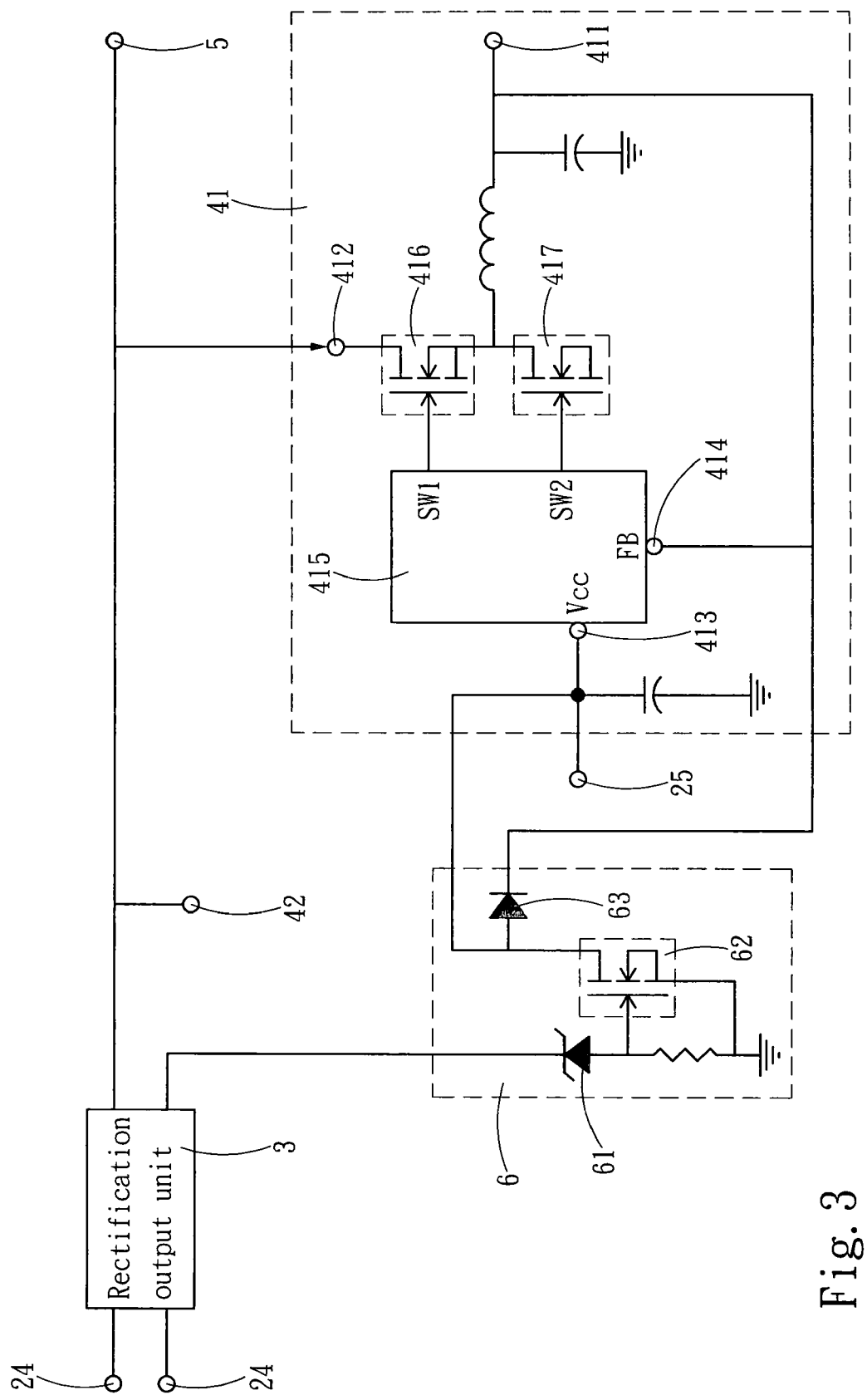
FIG. 3 is a circuit diagram of an embodiment of the invention.

Refer to FIG. 3 for the circuit diagram of an embodiment of the invention. The rectification output unit 3 receives induced power from the transformer 24 and the voltage rises to generate the main output power. The rectification output unit 3 is connected to the voltage regulation output unit 41 which has switches 416 and 417 connecting to the power input end 412 and a pulse width modulation unit 415 containing the biased driving end 413 and the feedback detection end 414. The biased driving end 413 is connected to the standby power system 25 to receive the standby power and activate the pulse width modulation unit 415. The feedback detection end 414 is connected to the delay trigger unit 6 to receive the trigger signal. The pulse width modulation unit 415 receives the trigger signal and starts sending a driving pulse to drive the switches 416 and 417 to switch and determine a voltage boosting process. Through switching of the switches 416 and 417, the main output power set ON at the power input end 412 can be regulated to become the secondary output power to be delivered from the secondary output end 411. The delay trigger unit 6 includes a Zener diode 61, a switch element 62 and a diode 63. The Zener diode 61 has a cathode connecting to the rectification output unit 3 to receive the main output power. The switch element 62 has two signal ends and a control end to determine whether the two signal ends to be electrically connected. The control end of the switch element 62 is connected to the anode of the Zener diode 61. One of the signal ends of the switch element 62 is grounded and another signal end is connected to the anode of the diode 63 and a voltage source which supplies power for the trigger signal. As shown in the drawing, the circuit in the embodiment gets the standby power by connecting to the standby power system 25 to serve the voltage source of the trigger signal. The diode 63 has the cathode connecting to the feedback detection end 414 of the pulse width modulation unit 415. In the event that the feedback detection end 414 receives a voltage higher than a preset voltage, it is judged an abnormal condition to stop output of the pulse. The delay trigger unit 6 sets a voltage judgment level through a breakdown voltage of the Zener diode 61. In the event that the main output power is lower than the voltage judgment level, the switch element 62 is cut off. The standby power passes through the diode 63 and is sent to the voltage judgment level, and orders the pulse width modulation unit 415 to enter an abnormal condition to stop sending the pulse. In the event that the main output power has the voltage risen higher than the breakdown voltage of the Zener diode 61, the Zener diode 61 functions in the breakdown zone and provides a voltage to the control end of the switch element 62 to connect two signal ends so that the switch element 62 directs the standby power to the ground end. The pulse width modulation unit 415 starts generating the pulse to regulate the secondary output power. The feedback detection end 414 is electrically connected to the secondary output end 411 to detect variations thereof. As the secondary output power is already formed, the diode 63 is cut off and isolated from the delay trigger unit 6. Through potential alterations of the delay trigger unit 6 and the main output power, the voltage alteration which the delay trigger unit 6 sends to the voltage regulation output unit 41 can form the trigger signal to control regulation of the voltage regulation output unit 41 and generate the time series of the secondary output power. Thus the object of controlling multiple output powers synchronously of the invention can be accomplished. Similarly, the rectification output unit 3 also can be connected to another voltage regulation output unit 42 or more than one of same as required. The voltage regulation output units 41 and 42 can be independently integrated on a printed circuit board.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power supply providing multiple synchronous outputs to reduce time series difference of multiple output power of the power supply, including a standby power system to receive input power and regulate to standby power and a main power system to receive the input power and regulate to become main output power, the main power system having a rectification output unit to deliver the main output power, the power supply further comprising:
  at least one delay trigger unit which is connected to the rectification output unit to receive the main output power, and sets a voltage judgment level and determines to output a trigger signal based on the main output power being greater than the voltage judgment level; and
  at least one voltage regulation output unit which has a biased driving end connecting to the standby power system to receive the standby power to activate the voltage regulation output unit, a power input end connecting to the rectification output unit to receive the main output power, a feedback detection end connecting to the delay trigger unit and a secondary output end to deliver secondary output power, the secondary output powers being separate and connected in parallel, the feedback detection end receiving the trigger signal to determine starting a voltage boosting process to regulate the main output power to become the secondary output power and the feedback detection end being electrically connected to the secondary output end to detect variation thereof;
  wherein the main output power requires a rise time and activation of the voltage regulation output unit requires another rise time, the delay trigger units outputting trigger signals so as to compensate for the rise times so that the main output power and secondary output power are made synchronous.

2. The power supply of claim 1, wherein the voltage regulation output unit is independently integrated on a printed circuit board.

3. The power supply of claim 2 further having a plurality of voltage regulation output units which are electrically connected to the rectification output unit and generate a plurality of secondary output power in which at least two of them have different potentials.

4. The power supply of claim 3, wherein each of the voltage regulation output units includes a set of switches connected to the power input end and a pulse width modulation unit, the pulse width modulation unit having the biased driving end to receive the standby power to activate the pulse width modulation unit and the feedback detection end to receive the trigger signal so that the pulse width modulation unit outputs a driving pulse to drive the switch to start the voltage boosting process.

5. The power supply of claim 4, wherein the delay trigger unit includes a Zener diode, a switch element and a second diode, the Zener diode having a cathode connecting to the rectification output unit, the switch element having two signal ends and a control end to determine whether the two signal ends are electrically connected, the control end of the switch element being connected to an anode of the Zener diode, one of the signal ends of the switch element being grounded and another signal end being connected to an anode of the second diode and the standby power providing electric power for the trigger signal, the second diode having its cathode connected to the feedback detection end of the pulse width modulation unit.

6. The power supply of claim 5, wherein the voltage source providing electric power for the trigger signal is the standby power system.

7. The power supply of claim 1 further having a plurality of voltage regulation output units which are electrically connected to the rectification output unit and generate a plurality of secondary output power in which at least two of them have different potentials.

8. The power supply of claim 7, wherein each of the voltage regulation output units includes a set of switches connected to the power input end and a pulse width modulation unit, the pulse width modulation unit having the biased driving end to receive the standby power to activate the pulse width modulation unit and the feedback detection end to receive the trigger signal so that the pulse width modulation unit outputs a driving pulse to drive the switch to start the voltage boosting process.

9. The power supply of claim 8, wherein the delay trigger unit includes a Zener diode, a switch element and a second diode, the Zener diode having a cathode connecting to the rectification output unit, the switch element having two signal ends and a control end to determine whether the two signal ends are electrically connected, the control end of the switch element being connected to an anode of the Zener diode, one of the signal ends of the switch element being grounded and another signal end being connected to an anode of the second diode and the standby power providing electric power for the trigger signal, the second diode having its cathode connecting to the feedback detection end of the pulse width modulation unit.

10. The power supply of claim 9, wherein the voltage source providing electric power for the trigger signal is the standby power system.

* * * * *